United States Patent
Sakakibara et al.

(10) Patent No.: US 9,435,946 B2
(45) Date of Patent: Sep. 6, 2016

(54) INTERLAYER LIGHT WAVE COUPLING DEVICE

(71) Applicant: NATIONAL INSTITUTE OF ADVANCED INDUSTRIAL SCIENCE AND TECHNOLOGY, Tokyo (JP)

(72) Inventors: Youichi Sakakibara, Ibaraki (JP); Ryohei Takei, Ibaraki (JP); Masahiko Mori, Ibaraki (JP); Toshihiro Kamei, Ibaraki (JP)

(73) Assignee: NATIONAL INSTITUTE OF ADVANCED INDUSTRIAL SCIENCE AND TECHNOLOGY (JP)

(*) Notice: Subject to any disclaimer, the term of this patent is extended or adjusted under 35 U.S.C. 154(b) by 0 days.

(21) Appl. No.: 14/345,346

(22) PCT Filed: Oct. 4, 2013

(86) PCT No.: PCT/JP2013/077037
§ 371 (c)(1),
(2) Date: Mar. 17, 2014

(87) PCT Pub. No.: WO2015/011845
PCT Pub. Date: Jan. 29, 2015

(65) Prior Publication Data
US 2016/0139334 A1    May 19, 2016

(30) Foreign Application Priority Data
Jul. 23, 2013   (JP) .................... 2013-152430

(51) Int. Cl.
G02B 6/26    (2006.01)
G02B 6/12    (2006.01)
G02B 6/122   (2006.01)

(52) U.S. Cl.
CPC ......... *G02B 6/12002* (2013.01); *G02B 6/1228* (2013.01); *G02B 2006/12038* (2013.01);
(Continued)

(58) Field of Classification Search
CPC . G02B 6/12002; G02B 6/1228; G02B 6/305
USPC .......................................... 385/43, 39, 50–52
See application file for complete search history.

(56) References Cited

U.S. PATENT DOCUMENTS 6,457,232 B1   10/2002   Isogai et al. .................... 29/833
7,065,271 B2    6/2006   Zheng et al. ................... 385/37
(Continued)

FOREIGN PATENT DOCUMENTS

JP    S637291       1/1988    ............. B25J 15/06
JP    2001136000    5/2001    ............. H05K 13/04
(Continued)

OTHER PUBLICATIONS

International Search Report issued in corresponding Japanese Patent Appln. No. PCT/JP2013/077037 dated Oct. 29, 2013 (9 pgs).
(Continued)

*Primary Examiner* — Ellen Kim
(74) *Attorney, Agent, or Firm* — Hayes Soloway P.C.

(57) ABSTRACT

An interlayer light wave coupling device includes a substrate; a first core disposed on the substrate and having a first acute structure; a third core spatially set apart from the first core and having a second acute structure; and a second core disposed between the first core and the third core and having a smaller index of refraction than the first core and the third core. The acute structures of the first core and the third core are disposed so as to have no overlap as viewed from above.

19 Claims, 7 Drawing Sheets

(52) U.S. Cl.
CPC ............... *G02B2006/12061* (2013.01); *G02B 2006/12073* (2013.01); *G02B 2006/12095* (2013.01); *G02B 2006/12147* (2013.01)

(56) References Cited

U.S. PATENT DOCUMENTS

| | | | | |
|---|---|---|---|---|
| 8,285,092 B2* | 10/2012 | Deki | ..................... | G02B 6/1228 385/28 |
| 9,195,001 B2* | 11/2015 | Hatori | .................. | G02B 6/1228 |
| 2007/0171515 A1* | 7/2007 | Kang | ..................... | H01S 5/026 359/333 |
| 2009/0297093 A1* | 12/2009 | Webster | ............... | G02B 6/1228 385/14 |

FOREIGN PATENT DOCUMENTS

| | | | | |
|---|---|---|---|---|
| JP | 2001267367 | 9/2001 | ......... | H01L 21/3205 |
| JP | 2008-139478 | 6/2008 | ............. | G02B 27/28 |
| JP | 2008-261952 | 10/2008 | ............. | G02B 6/122 |
| JP | 2010-230982 | 10/2010 | ............. | G02B 6/122 |
| JP | 2011124304 | 6/2011 | ............. | H01L 21/52 |
| JP | 2011-180166 | 9/2011 | ............... | G02B 6/13 |
| JP | 2013-006445 | 1/2013 | ............... | G60H 1/03 |

OTHER PUBLICATIONS

Sun, R. et al. "Impedance matching vertical optical waveguide couplers for dense high index contrast circuits" *Optics Express* vol. 16, No. 16 Aug. 4, 2008 (8 pgs).
Yao, J. et al. "Grating-coupler based low-loss optical interlayer coupling" *IEEE* p. 383-385, 2011 (3 pgs).
Kang, J. et al. "Layer-to-Layer Grating Coupler Based on Hydrogenated Amorphous Silicon for Three-Dimensional Optical Circuits" *Japan Journal of applied Physics* 51 (2012) 120203 (3 pgs).
Lee, D. "Monolithic Chip-to-Chip WDM optical Proximity Couple utilizing Echelle Grating Multiplexer/Demultiplexer Integrated with Micro Mirrors Built on SOI Platform" *IEEE* 2010 (2 pgs).
Takei, R. et al. "Low-Loss Optical Interlayer Coupler for Three-Dimensional On-Chip Optical Interconnect" (1 pg).
Takei, R. et al. "Ultra-Low-Loss Silicon Based Spot-Size Converter Fabricated by CMOS Compatible Process" *IEEE* 2012 (3 pgs).
International Preliminary Report on Patentability issued in application No. PCT/JP2013/077037, dated Jan. 26, 2016 (8 pgs).

* cited by examiner

INTERLAYER LIGHT WAVE COUPLING DEVICE

TECHNICAL FIELD

The present invention relates to an interlayer light wave coupling device.

BACKGROUND ART

Conventional high-performance computing systems require that the global wiring of the processor have sufficient communication bandwidth, minimal communication delay, lower power consumption, and other features. However, future improvement in the performance of existing metal wiring techniques cannot be sufficiently expected because of the reduced cross-sectional area of wiring, higher drive frequency, and other factors. In view of this situation, on-chip optical wiring techniques based on silicon photonics are promising, but the communication bandwidth needed in wiring continues to increase at a rapid speed, and no matter if optical wiring techniques are used, the bandwidth is insufficient with a single optical wiring layer. Consequently, there are high expectations for three-dimensional optical wiring techniques in which the optical wiring layer is multilayered and which are capable of dramatically increasing wiring density.

Three-dimensional optical wiring techniques not only expand bandwidth, but also have an advantage in that an optical waveguide intersection with low loss and low leakage can be implemented. This is due to the fact that two intersecting optical waveguides can be spatially separated. The importance of an optical waveguide intersection having excellent performance is dramatically increasing in accompaniment with higher density and more complicated optical wiring.

A low-loss optical coupling between two different optical wiring layers is indispensable for implementing three-dimensional optical wiring, and such implementation is not easy. This is because light is different from electricity when there is sudden bending of the transmission channel, or when considerable optical loss occurs due to discontinuity of the refractive index. Therefore, techniques such as the following have been proposed for light wave interchange between layers.

As shown in FIG. 7, a method has been proposed in which a plurality of spot size converters having a tapered structure used mainly in optical signal connection between chip and optical fiber are combined to mutually couple optical signals between optical waveguides disposed in different layers (see non-patent document 1).

In FIG. 7, (a) is a perspective view of an interlayer light wave coupling device, (b) is a schematic plan view thereof, and (c) is a schematic center transverse-sectional view thereof.

The optical waveguides disposed in an upper and lower layer mutually have a tapered structure. Therefore, in the case that optical waveguides of the upper and lower layers each exist independently, there is a location somewhere in the tapered structure in which effective refractive indexes match each other in the upper and lower layers, even when there are structural or material differences in refractive index in each optical waveguide. Accordingly, a light wave coupling that is insensitive to structural or material fluctuations in refractive index can be realized. Additionally, light wave coupling is used and therefore, in principle, results in low loss. Moreover, there is only a single coupling location of light waves between the upper and lower layers, and there is substantially no return of light waves to the source waveguide once the light waves have migrated.

With this method, it is difficult to sufficiently increase the interlayer distance. In other words, the distal end width of the tapered structure is sufficiently narrowed to allow the mode shape of the light waves to widely expand toward the exterior of the optical waveguide. Therefore, light waves can, in principle, be made to couple even when the interlayer distance is sufficiently increased, but in such a case, the light waves readily scatter out from the optical waveguide by slight disturbances in the optical waveguide structure that occur unintentionally, and this results in loss.

In other words, this method is highly efficiency, but has a drawback in that it is difficult to sufficiently increase the interlayer gap.

The next method uses a grating coupler in which a diffraction grating is provided to a side surface of an optical waveguide to thereby allow light to be drawn out to the side surface of the optical waveguide (see patent document 1, and non-patent documents 2 and 3).

However, this method has drawbacks including low efficiency in principle, high wavelength dependency, high dependency on the plane of polarization, and the requirement that specular surfaces disposed in the upper and lower layers be disposed with high positioning precision.

There is also a method that attempts to direct light to an optical waveguide in a different layer by placing a mirror in the optical waveguide to change the direction of propagation of light, and after the light has been directed toward a different layer, a similar mirror is used to direct the light to the optical waveguide of the different layer.

However, it is very difficult to form a specular surface having high reflectivity, and since silicon in particular has a high refractive index, it is even more difficult to form a specular surface.

Furthermore, the positioning tolerance of the specular surface between the upper and lower layers is low, and high manufacturing precision is required (see non-patent document 4).

PRIOR ART DOCUMENTS

Patent Documents

Patent Document 1: U.S. Pat. No. 7,065,271
Patent Document 2: Japanese Laid-open Patent Application No. 2011-180166
Patent Document 3: Japanese Patent Application No. 2013-006445

Non-patent Documents

Non-patent Document 1: R. Sun et al., "Impedance matching vertical optical wave guide couplers for dense high index contrast circuits," Opt. Express 16, pp. 11683-11690, 2008
Non-patent Document 2: J. Yao et al., "Grating-coupler based low-loss optical interlayer coupling," Proc. 8th int. Conf. Group IV Photonics, pp. 383-385, 2011
Non-patent Document 3: J. Kang et al., "Layer-to-Layer Grating Coupler Based on Hydrogenated Amorphous Silicon for Three-Dimensional Optical Circuits," J. Jpn. Appl. Phys., Vol. 51, 120203, 2012
Non-patent Document 4: D. C. Lee et al., "Monolithic Chip-to-chip WDM Optical Proximity Coupler Utilizing Echelle Grating Multiplexer/Demultiplexer Integrated with Micro Mirrors Built on SOI Platform," IEEE Photonics Society Summer Topical Meeting Series, pp. 215-216, 2010

Non-patent Document 5: "Ultra-Low-Loss Silicon Based Spot-Size Converter Fabricated using i-Line Photolithography" Proceedings of the 73rd JSAP Fall Meeting 2012.

Non-patent Document 6: Ryohei Takei et al., "Ultra-Low-Loss Silicon Based Spot-Size Converter Fabricated by CMOS Compatible Process," IEEE THE 9TH INTERNATIONAL CONFERENCE ON GROUP IV PHOTONICS (GFP) 29-31 Aug. 2012 WB4 P 36-38

DISCLOSURE OF THE INVENTION

Problems to be Solved by the Invention

The prior art disclosed in non-patent document 1 is insufficient due to the following point.

(1) The interlayer distance cannot be sufficiently increased.

The prior art disclosed in patent document 1 and non-patent documents 2 and 3 are insufficient due to the following points.

(2) In principle, the coupling efficiency is low.

(3) The coupling efficiency has very considerable wavelength dependency and polarization dependency.

(4) The grating couplers of the upper and lower layers must be disposed with high positioning precision.

The prior art disclosed in non-patent document 4 is insufficient due to the following points.

(5) It is difficult to form the specular surface of a mirror and it is difficult to achieve high-efficiency light wave coupling.

(6) The mirror surfaces of the upper and lower layers must be disposed with high positioning precision.

The present invention is proposed in view of the foregoing points (1) to (6), and an object thereof is to provide an interlayer light wave coupling device in which light waves propagated in the light wave circuit are coupled together with good efficiency for both pseudo TE mode and pseudo TM mode between different layers of a light wave circuit, and in which it is possible to sufficiently inhibit degradation of coupling efficiency due to structural and material fluctuations caused by manufacturing or the like.

Means for Solving the Problems

Means for solving the above-described problems are as follows.

(1) An interlayer light wave coupling device characterized in that at least two cores having an acute structure are spatially set apart from each other on a substrate interposed by another core having a smaller index of refraction than the two cores, and the acute structures of the two cores are disposed so as to have no overlap as viewed from above.

(2) An interlayer light wave coupling device characterized in being provided with: a substrate; a first core disposed on the substrate and having a first acute structure; a third core spatially set apart from the first core and having a second acute structure; and a second core disposed between the first core and the third core and having a smaller index of refraction than the first core and the third core, wherein the first acute structure and the second acute structure are disposed so as to have no overlap as viewed from above.

(3) The interlayer light wave coupling device according to (2), characterized in that the first core, the second core, and the third core are step refractive index waveguides or a graded refractive index waveguides.

(4) The interlayer light wave coupling device according to (2) or (3), characterized in that a cladding for covering the second core and the third core is furthermore provided on the substrate.

(5) The interlayer light wave coupling device according to any of (2) to (4), characterized in that the first core and the third core are composed of silicon.

(6) The interlayer light wave coupling device according to any of (2) to (5), characterized in that the second core is composed of any of SiON, $SiO_X$, SiN, SiC, GaAs, and InP.

(7) The interlayer light wave coupling device according to any of (4) to (6), characterized in that the cladding is composed of epoxy resin or $SiO_2$.

(8) The interlayer light wave coupling device according to any of (1) to (7), characterized in that the acute structure has a sloped sidewall at least on one side.

(9) The interlayer light wave coupling device according to any of (1) to (8), characterized in that both one side and another side constituting the acute structure have a sloped sidewall.

(10) The interlayer light wave coupling device according to any of (1) to (9), characterized in that the acute structure has a thickness that decreases in progress toward the distal end.

(11) The interlayer light wave coupling device according to (10), characterized in that the cross-sectional shape near the distal end of the acute structure is triangular.

(12) The interlayer light wave coupling device according to any of (1) to (11), characterized in that the substrate is a SOI substrate.

(13) The interlayer light wave coupling device according to any of (1) to (11), characterized in that the substrate is an optical integrated circuit substrate.

Effect of the Invention

In accordance with the present invention, it is possible to implement a light wave coupling structure for the interlayer of a light wave circuit in which loss is low and wavelength and polarization dependency are low.

BEST MODE FOR CARRYING OUT THE INVENTION (The Interlayer Light Wave Coupling Device According to the Present Invention)

FIGS. 1 to 4 are schematic views showing the basic structure of the interlayer light wave coupling device according to the present invention.

Figure 1:
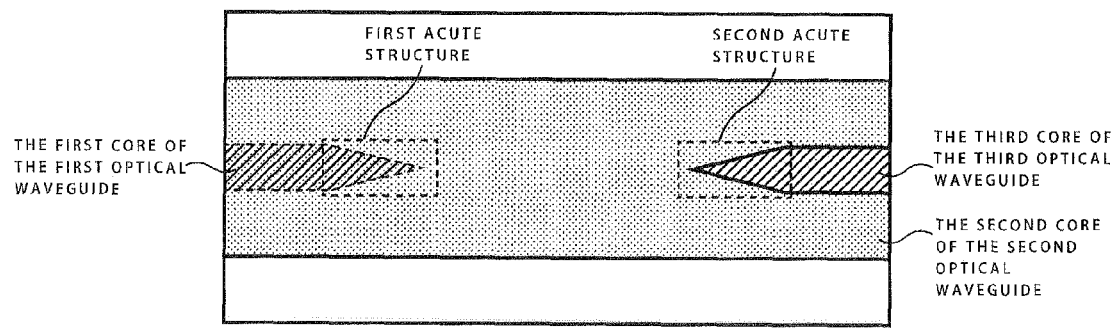
FIG. 1 is a schematic plan view showing the basic structure of the interlayer light wave coupling device according to the present invention.
Figure 2:
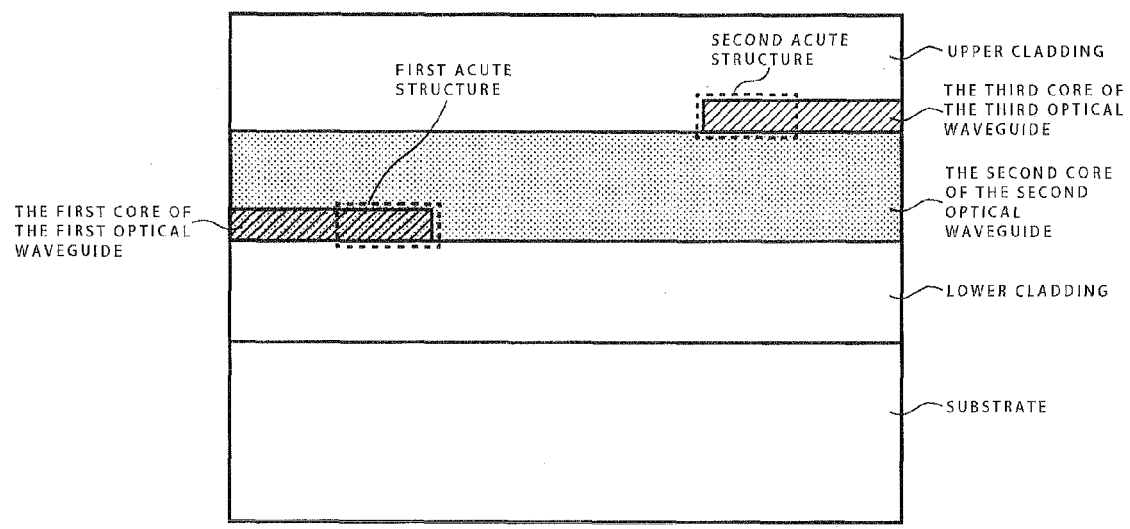
FIG. 2 is a schematic center transverse-sectional view showing the basic structure of the interlayer light wave coupling device according to the present invention.
Figure 3:
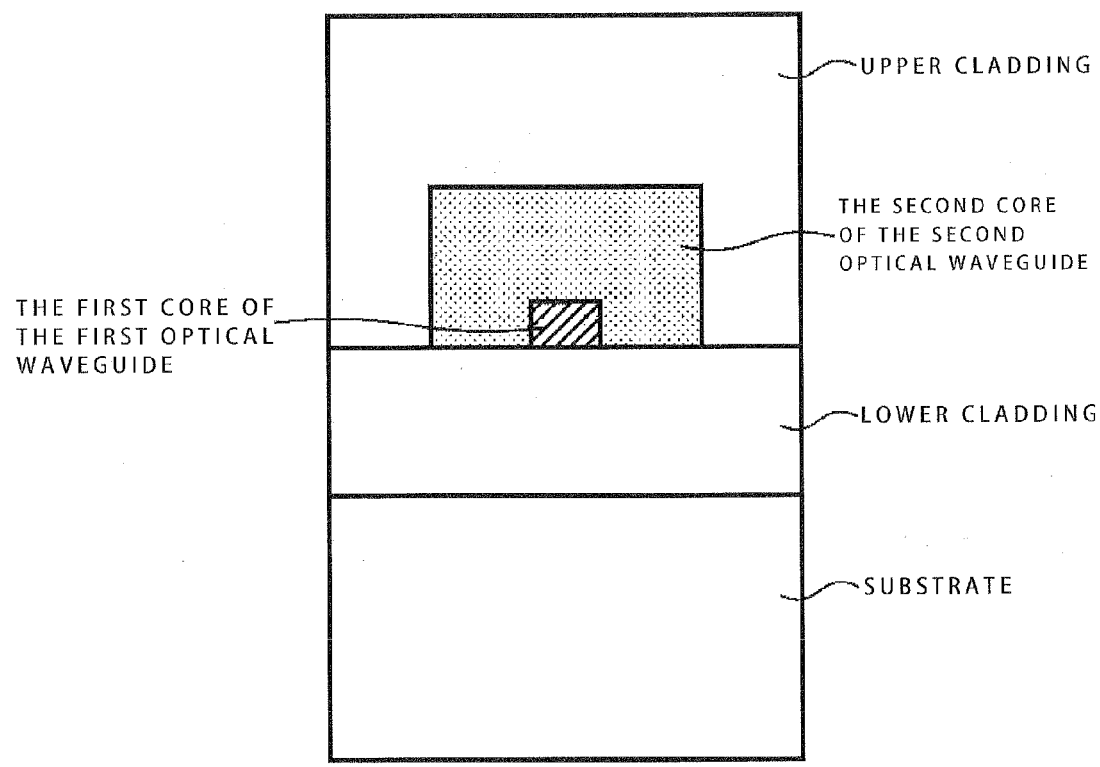
FIG. 3 is a schematic left side surface view showing the basic structure of the interlayer light wave coupling device according to the present invention.
Figure 4:
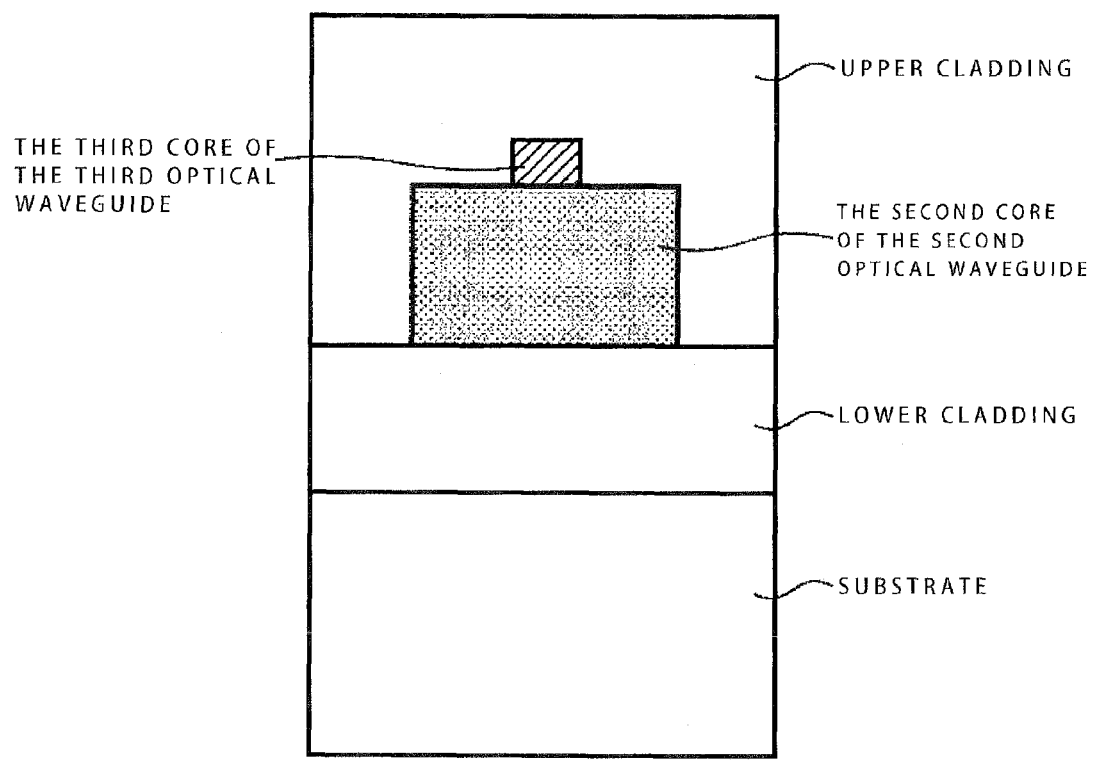
FIG. 4 is a schematic right side surface view showing the basic structure of the interlayer light wave coupling device according to the present invention.

FIG. 1 is a schematic plan view, FIG. 2 is a schematic center transverse-sectional view, FIG. 3 is a schematic left side surface view, and FIG. 4 is a schematic right side surface view.

The basic structure of the interlayer light wave coupling device according to the present invention shown in FIGS. 1 to 4 is as follows.

A first optical waveguide formed on a silicon-on-insulator (SOI) substrate or another substrate and a third optical waveguide of the upper layer are light wave-coupled via a second optical waveguide.

In FIGS. 1 and 2, the lengthwise direction of first and second acute structures is shorter than in actual practice and is schematically depicted.

The basic structure of the interlayer light wave coupling device comprises: a substrate; a first core of a first optical waveguide disposed on the substrate and having a first acute structure; a third core of a third optical waveguide spatially set apart from the first core and having a second acute structure; and a second core disposed between the first core and the third core and having a smaller index of refraction than the first core and the third core.

Furthermore, the first acute structure and the second acute structure are spatially disposed at distance from each other, and are disposed so as to have no overlap as viewed from above, as shown in FIGS. 1 to 4.

(Operation of the Interlayer Light Wave Coupling Device According to the Present Invention)

Light waves propagated through the first optical waveguide and the third optical waveguide pass through locations having an acute structure and are thereby coupled to the second optical waveguide. The light waves propagated through the second optical waveguide pass through locations having an acute structure and then into the third optical waveguide or the first optical waveguide disposed in different light wave circuit layers, and are thereby coupled together.

In the case of such a structure, the coupling efficiency of light waves in the second optical waveguide does not depend on the size of the core of the second optical waveguide as long as a suitable acute structure is used. The height of the core of the second optical waveguide is equivalent to the distance between layers, and the distance between layers can therefore be increased by increasing the core size of the second optical waveguide.

Also, since a continuous structure is used, the light wave-coupling efficiency between the layers is, in principle, very high and wavelength dependency is very low when an acute structure having a suitable lateral length is used.

(Acute Structure of the Interlayer Light Wave Coupling Device According to the Present Invention)

In the present invention, the structure of the core at the distal end part of the optical waveguide that forms an acute angle constitutes an acute structure. It is apparent from FIG. 1 that the structure in which the distal end of the core constitutes an isosceles triangle having an acute angle as viewed from above is a representative example.

The present inventors have proposed a method in which an acute structure for an optical waveguide can be fabricated in equivalent fashion to electron beam exposure techniques or immersion excimer stepper techniques, even when an i-line stepper or another low-resolution stepper is used (see patent document 2).

According to this method, an isosceles triangle having an acute angle in which each side of the distal end of the core has been equally removed at a slope, or a triangle having an acute angle with only one side of the distal end of the core removed at a slope can be fabricated with good precision.

The present inventors have furthermore proposed an acute structure in which a sloped sidewall is formed on one side of the distal end of the core, an acute structure in which the thickness decreases in progress toward the distal end, and a fabrication method therefor, in which the above-described techniques have been improved (see patent document 3, and non-patent documents 5 and 6).

In accordance therewith, modified examples furthermore include the following as acute structures.

(1) An acute structure having a sidewall sloped on one side.

The sloped angle of the sidewall is preferably 60 degrees or more and 85 degrees or less, and is more preferably 75 degrees or more and 80 degrees or less.

(2) An acute structure in which both one side and another side have a sloped sidewall.

The slope angle of the sidewall conforms to (1) above. The slope angle of each side is not necessarily required to be the same.

(3) An acute structure in which the thickness (height) decreases in progress toward the distal end.

(4) An acute structure in which the structures of (2) and (3) above are combined to thereby obtain a cross-sectional shape near the distal end that is triangular in the manner of a knife edge.

The acute structures of (1) to (4) described above can be achieved by suitably combining the double patterning technique disclosed in patent document 2 and the dry etching technique disclosed in patent document 3 and non-patent documents 5 and 6, in which it is possible to form a sloped structure of a core in which the lower part of the sidewall is wider than the upper part.

For example, the sloped structure of the sidewall in an acute structure can be achieved by carrying out inductively coupled reactive ion etching in a mixed gas atmosphere containing $SF_6$, which is a gas that undercuts silicon, and, e.g., $C_4F_8$, which is a gas capable of depositing a protective layer on the sidewalls, and then adjusting the mixture ratio $R\ (=SF_6/C_4F_8)$ of the gases to bring the slope to a suitable angle.

In the case that the height of the silicon core is 220 nm, a width of 100 nm or less is noted to be required for the pseudo TE mode in order to achieve low-loss light wave coupling, and the width at the distal end is preferably 50 nm or less for the pseudo TM mode.

With the interlayer light wave coupling device according to the present invention, an acute structure in which the distal end of the core has been narrowed is used, whereby polarization dependency of light wave coupling efficiency between layers can be reduced.

In particular, the acute structures (1) to (4) described above are capable of maintaining a width of 50 nm or less without breakage of the distal end of the cross-sectional structure. Therefore, polarization dependency of the light wave coupling efficiency between layers can be dramatically reduced for the pseudo TE mode as well as for the pseudo TM mode.

Next, in order to maintain high-efficiency light wave coupling, the entire first acute structure provided to the first optical waveguide is contained within the second optical waveguide, and it is sufficient that the entire bottom surface of the second acute structure provided to the third optical waveguide be in contact with the upper surface of the second optical waveguide.

Therefore, the width and length of the second optical waveguide can be increased, two acute structures are thereby no longer required to be made to face each other under very difficult conditions in terms of structure, and manufacturing costs can be reduced.

When light waves are to be caused to migrate between the two acute structures, a second optical waveguide having a low index of refraction is disposed therebetween, whereby the range in which the light waves spread out can be arbitrarily limited because scattering of the light waves is limited and the light waves travel so as to follow the interior of the second optical waveguide.

The range in which the two acute structures are disposed is thereby increased in all directions.

This not only increases the degree of freedom of design, but also has the effect of reducing [required] (*1) manufacturing precision and lowering manufacturing costs.

The structural feature in which the thickness (height) of the acute structure is reduced also has, in addition to the structuro-mechanical advantages, a physico-optical advantage for optical modes.

In other words, reducing the thickness increases the effectiveness of permeation light intensity from the silicon optical waveguide into the second optical waveguide core near the distal end in the pseudo TM mode, and as a result, mode conversion loss in the pseudo TM mode can be effectively reduced. Accordingly, polarization dependency of mode conversion loss can be reduced.

A sidewall slope-etching step for fabricating the acute structures of (1) to (4) described above can be carried out by i-line photolithography widely used in a back end of line (BEOL) for forming metal wiring of an LSI formed on an optical integrated circuit substrate or the like, and therefore has latent high compatibility with BEOL.

Accordingly, it is possible to anticipate a lower-cost optical integrated circuit layered on the metal wiring layer of a LSI, the optical integrated circuit having an optical wiring network based on hydrogenated amorphous silicon, which has high transparency and is capable of low-temperature growth.

(An Embodiment of the Interlayer Light Wave Coupling Device)

Figure 5:
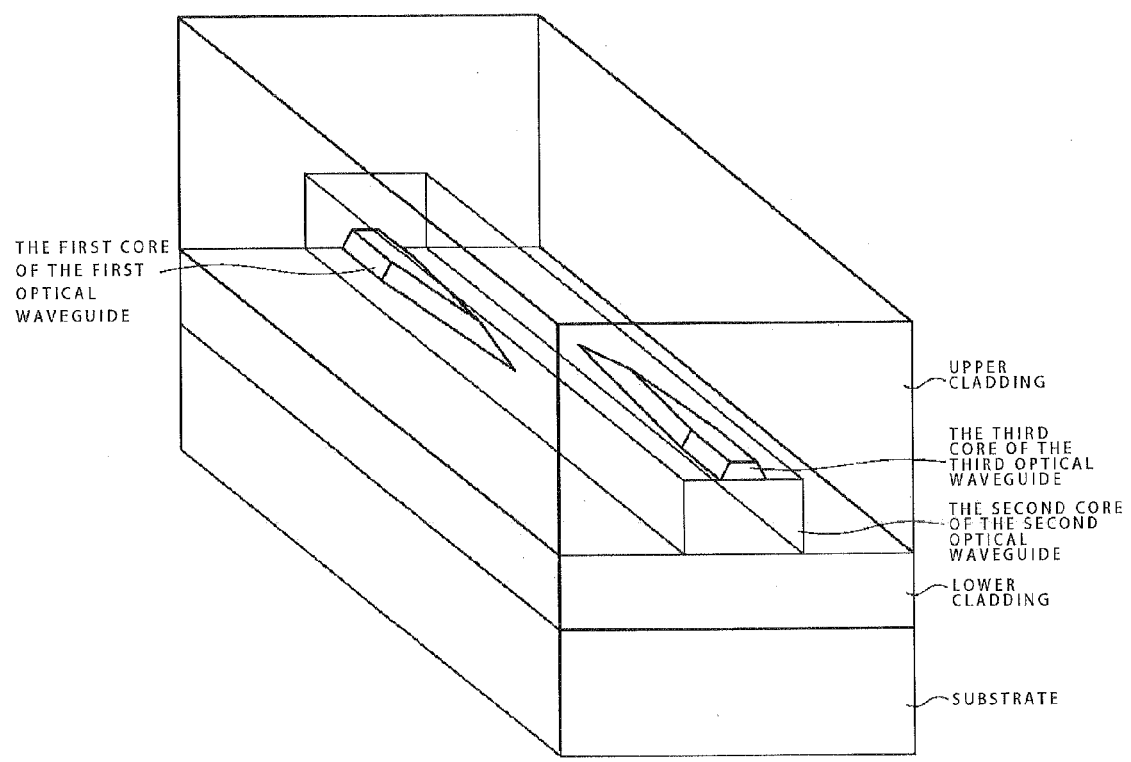
FIG. 5 is a perspective view of an embodiment of the interlayer light wave coupling device according to the present invention.

FIG. 5 is a perspective view of an embodiment of the interlayer light wave coupling device according to the present invention. It is apparent from FIG. 5 that a sloped sidewall is provided on the lower cladding formed on the substrate, and that a first core of a first optical waveguide having an acute structure with a cross-sectional triangular shape (also referred to as a knife-edge structure) is formed near the distal end.

A third core of a third optical waveguide also has the same shape as the first core, is spatially set at a distance from the first core, and is disposed so as to have no overlap [with the first core] as viewed from above.

A second core of a second optical waveguide having a smaller index of refraction than the first core and the third core is disposed between the first core and the third core.

The material of the first core and the third core is preferably silicon for reasons related to the index of refraction and the like.

The silicon material is not limited to crystalline silicon, and may also be polysilicon or amorphous silicon. In the case of amorphous silicon, hydrogenated amorphous silicon is preferred in order to reduce the absorption loss of the material, but other than silicon, it is also possible to use a material to which carbon, germanium, or the like has been added.

The material of the second core is preferably SiON, $SiO_X$, SiN, SiC, GaAs, or InP.

An upper cladding composed of an epoxy resin or $SiO_2$ is formed so as to cover the second core and the third core.

A silicon-on-insulator (SOI) substrate, an optical integrated circuit substrate, or the like is used as the substrate for the light wave coupling device in FIG. 5.

Figure 6:
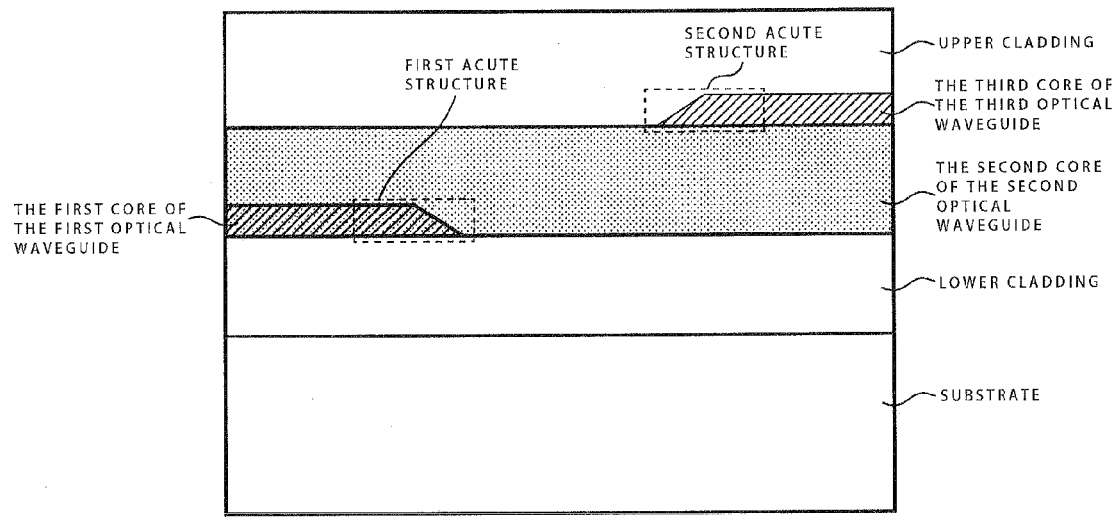
FIG. 6 is a schematic center transverse-sectional view of an embodiment of the interlayer light wave coupling device according to the present invention.
Figure 7:
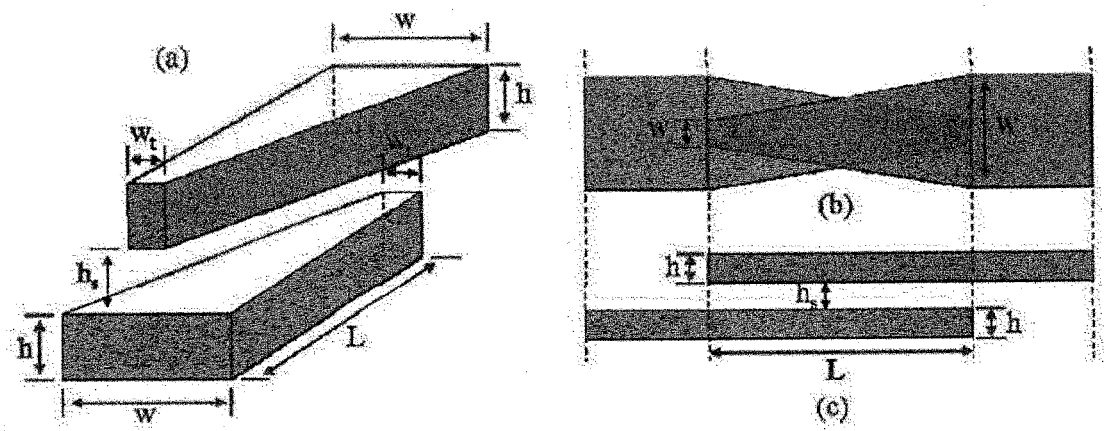
FIG. 7 is a schematic view showing the structure of a conventional interlayer light wave coupling device.

FIG. 6 is a schematic center transverse-sectional view thereof.

The drawing shows first to third cores of the first to third optical waveguides, the cross-sectional shapes of the first and second acute structures, and the positional relationships.

The first core of the first optical waveguide and the third core of the third optical waveguide are spatially set apart from each other via the second core of the second optical waveguide having a thickness of 1.0 μm in FIG. 6.

The thickness of the second optical waveguide may be any thickness as long as it is greater than that of the first optical waveguide.

The first acute structure of the first core and the second acute structure of the third core are spatially set apart from each other by about 100 μm.

It is crucial that the first acute structure of the first core and the second acute structure of the third core be disposed so as to have no overlap as viewed from above.

The upper cladding is formed so as to cover the second core of the second optical waveguide and the third core of the third optical waveguide.

The interlayer light wave coupling device of the present invention was described above with reference to the basic structure and embodiments shown in FIGS. 1 to 6, but these are ultimately for facilitating understanding of the interlayer light wave coupling device of the present invention.

Therefore, modifications and other embodiments based on the technical concepts of the present invention described in the claims are naturally included in the interlayer light wave coupling device of the present invention.

For example, the sides of the acute structures of the first core and the third core in the basic structure and embodiments shown in FIGS. 1 to 6 are linear in shape as viewed from above, but also may be a concave shape or a convex shape.

Also, at least one among the first core, the second core, and the third core may be a graded refractive index waveguide or a step refractive index waveguide. In such a case, the effective index of refraction of when the first optical waveguide and the third optical waveguide are independently present must be greater than that of the second optical waveguide.

The invention claimed is:

1. An interlayer light wave coupling device comprising: a substrate; a first core disposed on the substrate, the first core having a first acute structure and comprising hydrogenated amorphous silicon; a third core spatially set apart from the first core, the third core having a second acute structure and comprising hydrogenated amorphous silicon; and a second core disposed between the first core and the third core and having a smaller index of refraction than the first core and the third core, the first acute structure and the second acute structure being disposed so as to have no overlap as viewed from above, and wherein the acute structure has a sloped sidewall at least on one side.

2. The interlayer light wave coupling device according to claim 1, wherein at least one core among the first core, the second core, and the third core is a step refractive index waveguide or a graded refractive index waveguide.

3. The interlayer light wave coupling device according to claim 1, wherein a cladding for covering the second core and the third core is furthermore provided on the substrate.

4. The interlayer light wave coupling device according to claim 1, wherein the second core is composed of any of SiON, $SiO_X$, SiN, SiC, GaAs, and InP.

5. The interlayer light wave coupling device according to claim 1, wherein the cladding is composed of epoxy resin or $SiO_2$.

6. The interlayer light wave coupling device according to claim 1, wherein both one side and another side form the acute structure have a sloped sidewall.

7. The interlayer light wave coupling device according to claim 1, wherein the acute structure has a thickness that decreases in progress toward a distal end.

8. The interlayer light wave coupling device according to claim 7, wherein the cross-sectional shape near the distal end of the acute structure is triangular.

9. The interlayer light wave coupling device according to claim 1, wherein the substrate is a SOI substrate.

10. The interlayer light wave coupling device according to claim 1, wherein the substrate is an optical integrated circuit substrate.

11. The interlayer light wave coupling device according to claim 2, wherein a cladding for covering the second core and the third core is furthermore provided on the substrate.

12. The interlayer light wave coupling device according to claim 2, wherein the second core is composed of any of SiON, $SiO_X$, SiN, SiC, GaAs, and InP.

13. The interlayer light wave coupling device according to claim 11, wherein the cladding is composed of epoxy resin or $SiO_2$.

14. The interlayer light wave coupling device according to claim 2, wherein the acute structure has a sloped sidewall at least on one side.

15. The interlayer light wave coupling device according to claim 2, wherein both one side and another side form the acute structure have a sloped sidewall.

16. The interlayer light wave coupling device according to claim 2, wherein the acute structure has a thickness that decreases in progress toward the distal end.

17. The interlayer light wave coupling device according to claim 16, wherein the cross-sectional shape near a distal end of the acute structure is triangular.

18. The interlayer light wave coupling device according to claim 2, wherein the substrate is a SOI substrate.

19. The interlayer light wave coupling device according to claim 2, wherein the substrate is an optical integrated circuit substrate.

* * * * *